United States Patent
Hemmaplardh et al.

(10) Patent No.: US 10,296,548 B2
(45) Date of Patent: May 21, 2019

(54) DELIVERING CONTENT PROMOTING A WEB PAGE TO USERS OF AN ONLINE SYSTEM

(71) Applicant: Facebook, Inc., Menlo Park, CA (US)

(72) Inventors: Hannah Marie Hemmaplardh, Seattle, WA (US); Jinyi Yao, Issaquah, WA (US); Ahmed Magdy Hamed Mohamed, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 345 days.

(21) Appl. No.: 15/365,743

(22) Filed: Nov. 30, 2016

(65) Prior Publication Data

US 2018/0150560 A1    May 31, 2018

(51) Int. Cl.

| | |
|---|---|
| *G06F 16/95* | (2019.01) |
| *G06F 16/9535* | (2019.01) |
| *H04L 29/08* | (2006.01) |
| *H04L 29/06* | (2006.01) |
| *G06Q 30/02* | (2012.01) |
| *G06Q 50/00* | (2012.01) |

(52) U.S. Cl.
CPC ..... *G06F 16/9535* (2019.01); *G06Q 30/0241* (2013.01); *G06Q 30/0255* (2013.01); *G06Q 30/0277* (2013.01); *G06Q 50/01* (2013.01); *H04L 63/102* (2013.01); *H04L 67/306* (2013.01)

(58) Field of Classification Search
CPC ............ G06F 16/9535; G06Q 30/0241; G06Q 30/0255
See application file for complete search history.

(56) References Cited

U.S. PATENT DOCUMENTS

2013/0073473 A1*  3/2013  Heath ............... G06Q 30/02
                                              705/319
2014/0337129 A1* 11/2014  Carmel ............ G06Q 30/0255
                                              705/14.53

* cited by examiner

*Primary Examiner* — Loc Tran
(74) *Attorney, Agent, or Firm* — Fenwick & West LLP (57) ABSTRACT

An online system maintains a web page associated with one or more page administrators. The online system trains a machine learning model to determine a likelihood of a page administrator account accepting a request for the online system to present content about the web page to other users of the online system. The model uses features extracted from data about the page administrator accounts on the online system, the page administrator interactions with the online system, and the web page. The online system selects one or more page administrator accounts and sends them requests based on the determined likelihood scores. The online system delivers content associated with the web page to users of the online system based on a response to the request.

18 Claims, 6 Drawing Sheets

DELIVERING CONTENT PROMOTING A WEB PAGE TO USERS OF AN ONLINE SYSTEM

BACKGROUND

This disclosure relates generally to delivering content, and in particular, to using a machine learning model to predict page administrators of a web page who are likely to accept a request to promote the web page, and based on an approval of the request, delivering content promoting the web page to users of the online system.

Online systems, such as social networking systems, present content to users. Examples of content include content received from content provider systems or content provided by other users, for example, videos or images uploaded by users, comments provided by users on content previously uploaded, and other content formats. An online system targets content to users that are most likely to be interested in the content and that are likely to interact with the content. This includes targeting content to users who are themselves in charge of some content on the online system. If the online system presents content that users are unlikely to be interested in, there is a chance that any content that is interesting to the user becomes buried within less interesting or uninteresting content. Conventional systems often deliver content that may not be of interest to users, thereby providing a poor user experience. Online systems that provide poor user experiences are likely to lose user loyalty. In addition, users in charge of content in the online system are unlikely to be motivated to promote their content within the online system to other users.

SUMMARY

An online system maintains a web page associated with one or more page administrators who maintain the web page, and are authorized to accept or reject requests and changes associated with the web page. The online system predicts a likelihood that a page administrator is interested in promoting the web page. The online system promotes the web page by sending a page promotion content item about the web page to a plurality of users of the online system. In some embodiments, the online system uses a machine learning model to determine a likelihood that a page administrator is interested in promoting the web page. The machine learning model receives as input, features associated with a page administrator, for example, features that describe a user profile of the page administrator, interactions of the page administrator with the online system, and interactions of the page administrator with the web page associated with the page administrator. In some embodiments, the online system uses a weighted aggregate of scores associated with the features to determine the likelihood that the page administrator is interested in promoting the web page by sending a page promotion content item about the web page to a plurality of users on the online system.

For each of the page administrators associated with the web page, the online system extracts the features from stored data associated with the page administrator and the web page. The online system generates a page administrator score for each page administrator, based on the machine learning model or based on the weighted aggregate of the features. The page administrator score indicates the likelihood that the page administrator will want the online system to deliver content items associated with the web page to users of the online system.

The online system selects one or more page administrators from a set of page administrators associated with the web page based on the generated page administrator scores. The online system generates a content item specific to the selected page administrators and sends the content item to the selected page administrator accounts. If a page administrator subsequently requests that the online system generate a page promotion content item, the online system delivers a content item describing the web page to users of the online system.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Overall System Environment

Figure 1:
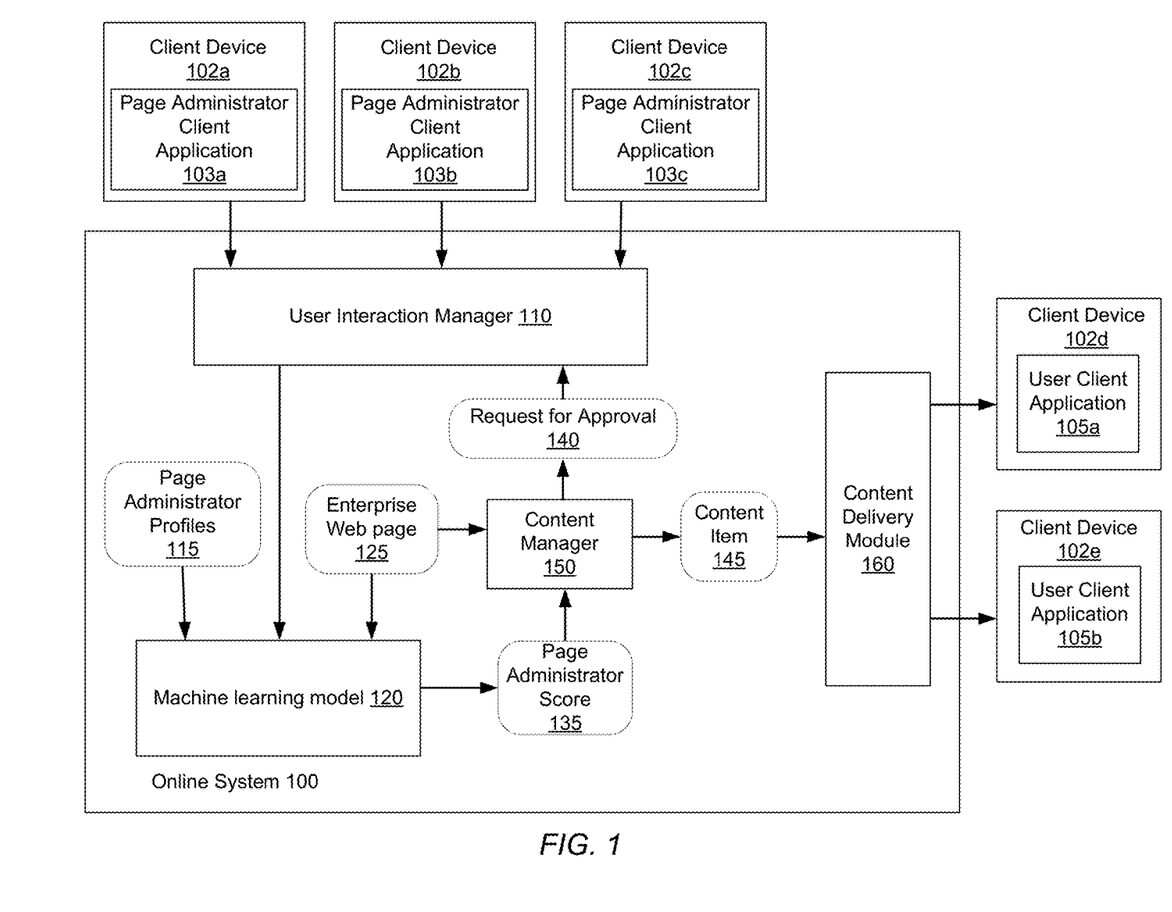
FIG. 1 is a block diagram of a system environment in which an online system operates, in accordance with an embodiment.

FIG. 1 is a block diagram of a system environment for an online system 100. The system environment, shown by FIG. 1, comprises one or more client devices 102 running user client applications 105, one or more client devices 102 running page administrator client applications 103, and the online system 100, with which the users interact. In alternative configurations, different and/or additional components may be included in the system environment. The embodiments described herein can be adapted to social networking systems presenting content to users.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105B" in the figures).

The client devices 102 are computing devices capable of receiving user input and transmitting and/or receiving data via a network. In one embodiment, a client device 102 is a conventional computer system, such as a desktop or a laptop computer. Alternatively, a client device 102 may be a device having computer functionality, such as a personal digital assistant (PDA), a mobile telephone, a smartphone or another suitable device. A client device is configured to communicate via the network. In one embodiment, a client device executes an application allowing a user of the client device to interact with the online system 100. For example, a client device executes a browser application to enable interaction between the client device and the online system 100 via the network. In another embodiment, a client device interacts with the online system 140 through an application programming interface (API) running on a native operating system of the client device, such as IOS® or ANDROID™.

The client devices 102 are configured to communicate via the network, which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network may be encrypted using any suitable technique or techniques.

One or more third party systems may be coupled to the network for communicating with the online system 100, which is further described below in conjunction with FIG. 3. In one embodiment, a third party system is an application provider communicating information describing applications for execution by a client device or communicating data to client devices for use by an application executing on the client device. In other embodiments, a third party system provides content or other information for presentation via a client device. A third party system may also communicate information to the online system 100, such as content, sponsored content such as advertisements, or information about a product, a service, or an application provided by the third party system.

Users interact with the online system 100 using user client applications 105 or page administrator client applications 103. For example, a user may use an internet browser to access content provided by the online system 100. Some of the users are privileged users, for example, page administrators with extra privileges to alter or interact with some content on the online system 100.

Online systems such as the online system 100 host web pages 125. Web pages 125 may be used by enterprises (e.g. companies or organizations) or individuals. For example, a web page 125 may describe products and services offered by a business or it may describe information about a specific topic (e.g. nature, science, or books). In one embodiment, the web page 125 is an enterprise web page. The web page 125 may include hypertext markup language (HTML), image files, JavaScript, or other content.

A web page 125 is associated with one or more page administrators that maintain the web page 125. A page administrator may upload content to the web page 125, manage the configuration of the web page 125, and perform other tasks associated with the maintenance of the web page 125. The page administrator may also augment the content of the web page 125 on the online system 100 by interacting with fans of the web page 125 via comments or messages.

A fan of a web page is a user that performed one or more interactions with the online system 100 indicating that the user liked the web page or the user was interested in receiving information posted on the web page or information associated with the web page.

The page administrator may have authority to approve requests on behalf of an enterprise associated with the page administrator, for example, to approve requests received from the online system 100. In an embodiment, the online system 100 requests approval from a page administrator of the web page for allowing the online system to deliver content describing the web page to users of the online system 100. The online system 100 delivers content describing the web page to users of the online system responsive to receiving approval request from a page administrator of the web page to generate a page promotion content item for display to users of the online system 100.

The online system 100, shown in FIG. 1, comprises a user interaction manager 110, a machine learning model 120, a content manager 150, and a content delivery module 160. In other embodiments, the online system 100 includes more or fewer components than shown in FIG. 1.

The user interaction manager 110 configures user interfaces that are presented to users of the online system 100. For example, these user interfaces might appear in the user client applications 105 or in the page administrator client applications 103. The user interaction manager 110 also receives user interactions from users via the user interfaces. According to one embodiment, the user interaction manager 110 additionally keeps a log of the interactions users have with the online system 100.

The online system 100 additionally stores information about the web page 125, and the user profile information of the page administrators 115.

According to an embodiment, a machine learning model 120, is configured to use various features that are associated with the web page 125, the profiles of the page administrators 115, and the user interactions with the online system 100 as tracked by the user interaction manager 110 to determine a score 135 for each page administrator who is associated with the web page 125. The score 135 represents the likelihood that the page administrator will be interested in promoting the web page 125 by sending a page promotion content item, suggested by the online system 100, to a plurality of users on the online system 100.

Figure 3:
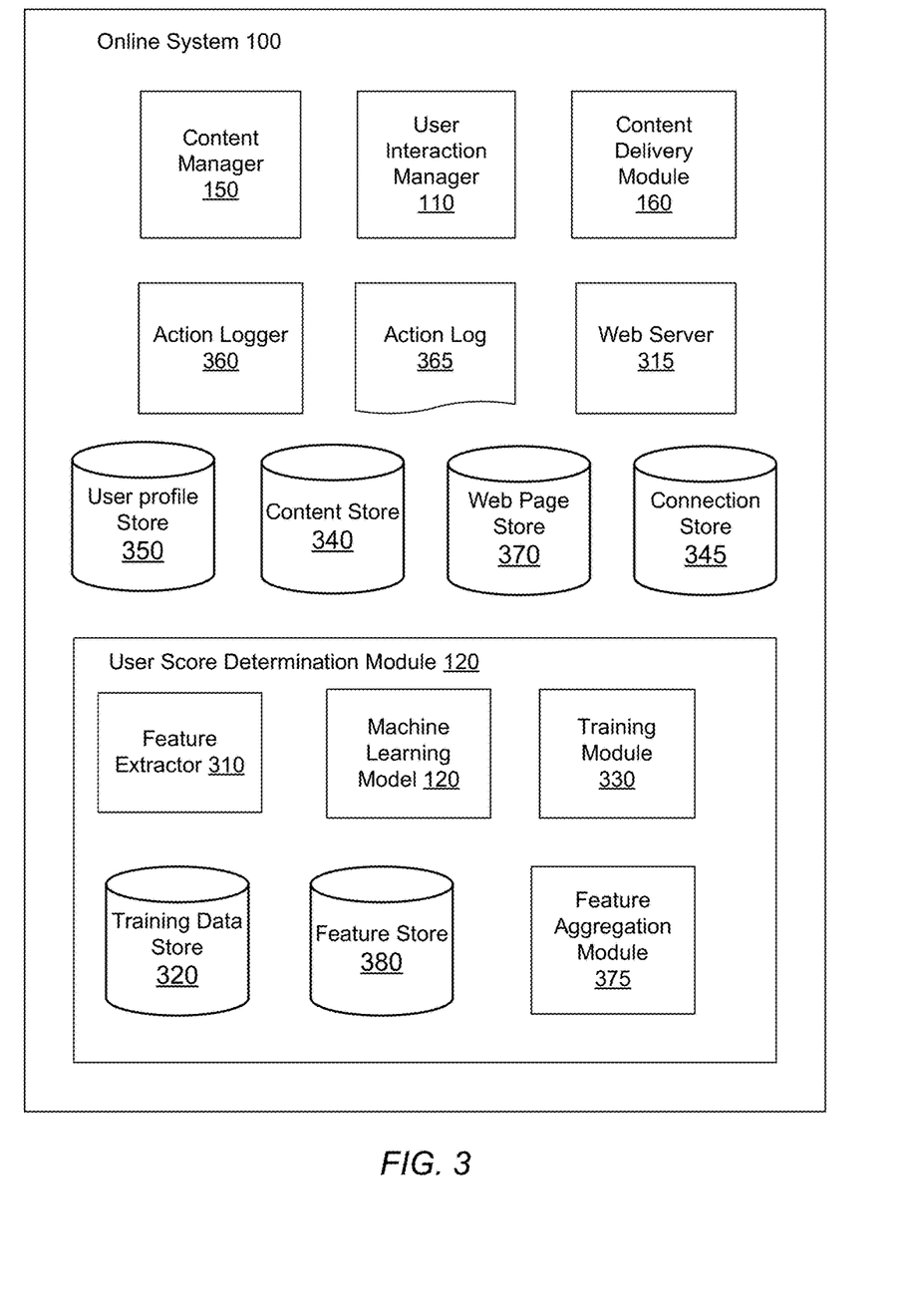
FIG. 3 is a block diagram of an architecture of the online system, according to an embodiment.

The training module 330, illustrated in FIG. 3, may train the machine learning model by extracting features from historical data indicating responses of page administrators to past requests for approval to display promotional content to users, sent to the page administrators by the online system 100. Dimensionality reduction (e.g., via linear discriminant analysis, principle component analysis, etc.) may be used to reduce the amount of data in the feature vector to a smaller, more representative core set of features. Features extracted from text include keywords and features extracted from video or images may include text (e.g., metadata associated with the image or video), color, texture, motion rigidity, audio, etc. The training set for the machine learning models includes positive and negative examples of responses of page administrators to requests from the online system 100. In supervised training, example web pages and their page administrators representing specific features are provided as training sets. The training process provides machine learning models that can then be used as prediction models to rank page administrators for web pages that have not been encountered by the machine learning model before.

Machine learning algorithms used include support vector machines (SVMs), boosting for other algorithms (e.g., AdaBoost), neural net, logistic regression, naïve Bayes, memory-based learning, random forests, bagged trees, decision trees, boosted trees, boosted stumps, etc. The accuracy of the trained machine learning model is evaluated using a validation set that was formed as a disjoint set of the data for testing the trained machine learning model to ensure the machine learning model generalizes to non-training data. Common metrics applied in accuracy measurement include: Precision=TP/(TP+FP) and Recall=TP/(TP+FN), where precision is how many the machine learning model correctly guessed (TP or true positives) out of the total it predicted (TP+FP or false positives) and recall is how many it correctly guessed (TP) out of the total that did represent the concept (TP+FN or false negatives). The F score (F-score=2*PR/(P+R)) unifies the two into one measure, and the system can reject or iterate on the model as needed based on the accuracy measurement result. Ultimately, the trained machine learning model is used to rank unknown page administrators based on the same features being extracted from information associated with these unknown page administrators, as described herein.

A content manager 150 receives the score values 135 that are assigned to each page administrator associated with the web page 125. The content manager 150 selects one or more page administrators that are associated with the web page 125 based on their score values 135 (for example, the content manager 150 selects one or more page administrators with the highest score), and sends a request for approval 140 to each of the selected page administrators. The requests for approval 140 request approval of the page administrators to send promotional content describing the web page to users of the online system 100. In an embodiment, a request for approval is a content item (for example, an advertisement) sent to a page administrator encouraging the page administrator to promote the web page 125 by sending sponsored content items via the online system 100. The request for approval 140 is part of the content item (or advertisement) sent to the page administrator that allows the page administrator to purchase or turn down offers to promote the web page on the online system 100. In an embodiment, the online system sends an example content item for promoting the web page to the page administrator along with the request for approval. The page administrator may accept the request and request the online system to promote the web page using the example content item. Alternatively, the page administrator may request the online system to promote the web page using another content item.

The content manager 150 receives a response to the request for approval from the page administrator. If the content manager 150 determines that the page administrator approves the request 140, the content manager 150 identifies a content item 145 describing the web page 125. The content manager sends the identified content item 145 for promoting the web page to users of the online system 100 via a content delivery module 160.

The content delivery module 160 delivers content items to users. In some embodiments, the content delivery module sends content items to users as part of a newsfeed provided to users, on a side bar, or by any other mechanism by which the online system 100 provides content to users.

Figure 2:
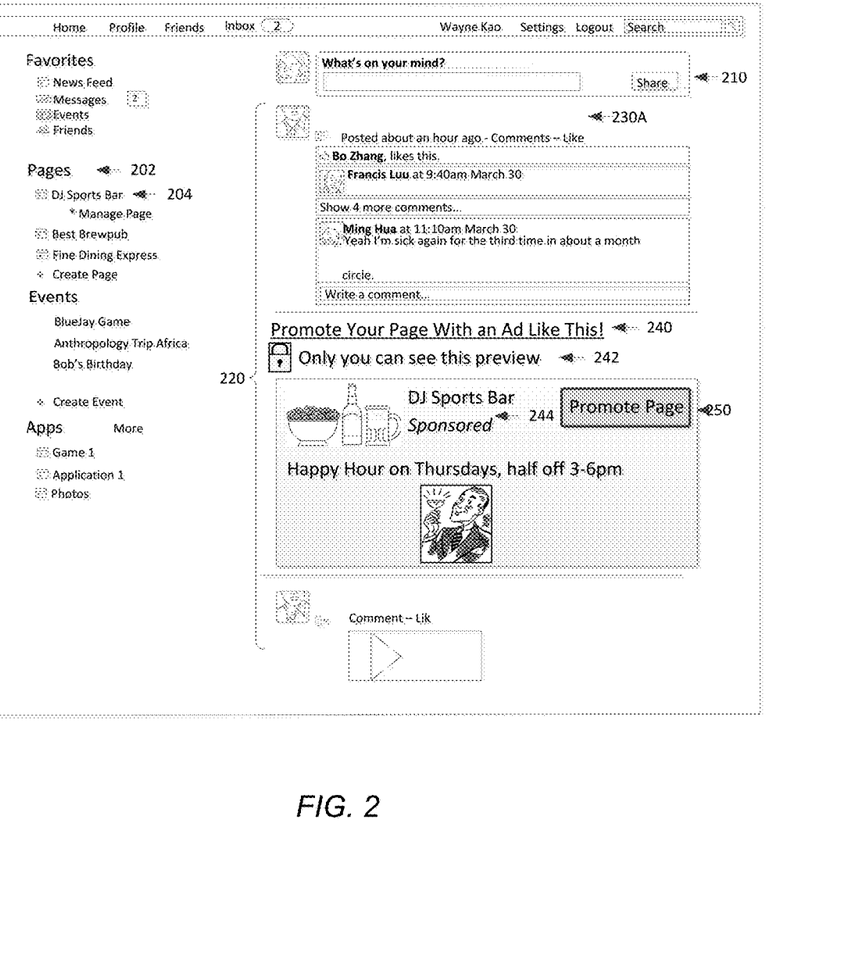
FIG. 2 shows a user interface displaying a request for approval presented to a page administrator, according to one embodiment.

FIG. 2 shows a user interface displaying a request for approval 140 that is presented to a page administrator on a page administrator client application 103 through a newsfeed 220, according to one embodiment. The request for approval 140 requests permission from the page administrator to deliver content describing the web page 125, or content describing the enterprise or organization associated with the web page 125, to other users of the online system 100. The example shown in FIG. 2 is one such request that also displays sample content that can be provided to other users of the online system 100. The page administrator may accept the request using a provided widget 250. In the embodiment shown in FIG. 2, the widget 250 takes the form of a button. The page administrator clicks on the button corresponding to the widget 250 to approve the request.

System Architecture

FIG. 3 is a block diagram of an architecture of the online system, according to an embodiment. The online system 100 shown in FIG. 3 includes a user profile store 350, a content store 340, a web page store 370, an action logger 360, an action log 365, a connection store 345, a content manager 150, a user interaction manager 110, a content delivery module 160, a web server 315, and a user score determination module 120. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

A user of the online system 100 is associated with a user profile, which is stored in the user profile store 350. A user profile includes declarative information about the user that was explicitly shared by the user and may also include profile information inferred by the online system 100. In one embodiment, a user profile includes multiple data fields, each describing one or more attributes of the corresponding user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the users displayed in an image, with information identifying the images in which a user is tagged or stored in the user profile of the user. A user profile in the user profile store 350 may also maintain references to actions by the corresponding user performed on content items in the content store 340 and stored in the action log 365.

While user profiles in the user profile store 350 are frequently associated with individuals, allowing individuals to interact with each other via the online system 100, user profiles may also be stored for entities such as businesses or organizations (e.g., brand page). This allows an entity to establish a presence on the online system 100 for connecting and exchanging content with other online system users. The entity may post information about itself, about its products or provide other information to users of the online system 100 using a brand page associated with the entity's user profile. Other users of the online system 100 may connect to the brand page to receive information posted to the brand page or to receive information from the brand page. A user profile associated with the brand page may include information about the entity itself, providing users with background or informational data about the entity.

The content store 340 stores objects that each represent various types of content. Examples of content represented by an object include a page post, a status update, a photograph, a video, a link, a shared content item, a gaming application achievement, a check-in event at a local business, a brand page, or any other type of content. Users may create objects stored by the content store 340, such as status updates, photos tagged by users to be associated with other objects in the online system 100, events, groups or applications. In some embodiments, objects are received from third-party applications or third-party applications separate from the online system 100. In one embodiment, objects in the content store 340 represent single pieces of content, or content "items." Hence, users are encouraged to communicate with each other by posting text and content items of various types of media to the online system 100 through various communication channels. This increases the amount of interaction of users with each other and increases the frequency with which users interact within the online system 100.

The action logger 360 receives communications about user actions internal to and/or external to the online system 100, populating the action log 365 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 365.

The action log 365 may be used by the online system 100 to track user actions on the online system 100, as well as actions on third party systems that communicate information to the online system 100. Users may interact with various objects on the online system 100, and information describing these interactions is stored in the action log 365. Examples of interactions with objects include: commenting on posts, sharing links, checking-in to physical locations via a client device, accessing content items, and any other suitable interactions. Additional examples of interactions with objects on the online system 100 that are included in the action log 365 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 365 may record a user's interactions with advertisements on the online system 100 as well as with other applications operating on the online system 100. In some embodiments, data from the action log 365 is used to infer interests or preferences of a user, augmenting the interests included in the user's user profile and allowing a more complete understanding of user preferences.

The action log 365 may also store user actions taken on a third party system, such as an external website, and communicated to the online system 100. For example, an e-commerce website may recognize a user of an online system 100 through a social plug-in enabling the e-commerce website to identify the user of the online system 100. Because users of the online system 100 are uniquely identifiable, e-commerce websites, such as in the preceding example, may communicate information about a user's actions outside of the online system 100 to the online system 100 for association with the user. Hence, the action log 365 may record information about actions users perform on a third party system, including web page viewing histories, advertisements that were engaged, purchases made, and other patterns from shopping and buying. Additionally, actions a user performs via an application associated with a third party system and executing on a client device may be communicated to the action logger 360 by the application for recordation and association with the user in the action log 365.

In one embodiment, the connection store 345 stores information describing connections between users and other objects on the online system 100. Some connections may be defined by users, allowing users to specify their relationships with other users. For example, users may generate connections with other users that parallel the users' real-life relationships, such as friends, co-workers, partners, and so forth. Other connections are generated when users interact with objects in the online system 100, such as expressing interest in a page on the online system 100, sharing a link with other users of the online system 100, and commenting on posts made by other users of the online system 100.

In one embodiment, a connection may include various features each representing characteristics of interactions between users, interactions between users and objects, or interactions between objects. For example, features included in a connection describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 100, or information describing demographic information about the user. Each feature may be associated with a source object or user, a target object or user, and a feature value. A feature may be specified as an expression based on values describing the source object or user, the target object or user, or interactions between the source object or user and target object or user; hence, a connection may be represented as one or more feature expressions.

The connection store 345 also stores information about connections, such as affinity scores for objects, interests, and other users. Affinity scores, or "affinities," may be computed by the online system 100 to approximate a user's interest in an object or in another user in the online system 100 based on the actions performed by the user. A user's affinity may be computed by the online system 100 to approximate the user's interest in an object, in a topic, or in another user in the online system 100 based on actions performed by the user.

The user interaction manager 110 configures user interfaces for presenting to the users. For example, in one embodiment it may be responsible for configuring HTML documents into user interfaces. The user interaction manager 110 also receives and stores information describing user interactions of various users including the page administrators. These interactions include social interactions of the page administrators, updates to the web page performed by the page administrators, and responses of page administrators to requests for approval associated with sponsored content sent by the online system 100 to the page administrator, the responses indicating whether the page administrator approved the request, rejected the request or ignored the request.

The web server 315 links the online system 100 via the network 120 to the one or more client devices 110, as well as to the one or more third party systems 130. The web server 315 serves web pages, as well as other content, such as JAVA®, FLASH®, XML and so forth. The web server 315 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 315 may provide application programming interface (API) functionality to send data directly to native client device operating systems, such as IOS®, ANDROID™, WEBOS® or BlackberryOS.

The web page store 370 stores the web page 125 and data related to the web page 125. For example, the web page store may contain HTML documents, JavaScript or PHP code, style documents, image files, and other content related to the web page 125, in one embodiment.

The content manager 150 receives page administrator scores 135 generated by the user score determination module 120. The content manager 150 also has access to information about the web page 125, such as information stored in the web page store 370. Based on the page administrator scores 135, the content manager 150 selects page administrators who are likely to be interested in promoting the web page and thus are likely to accept a request for approval to send promotional content items associated with the web page 125 to users of the online system. If a page administrator score 135 is greater than a predetermined threshold value, the content manager 150 uses information and data from the web page store 370 to develop a request for approval 140 to send to the page administrator with the high page administrator score 135. In some embodiments, the content manager 150 can tailor each request for approval such that it is the type of content request the page administrator is most likely to respond to. In some embodiments, requests for approval take the form of coupons that make it cheaper or otherwise more worthwhile for page administrators to allow the display of content, upsell, ego services, or mobile promote buttons (e.g. prominent request buttons on a user interfaces of a mobile device used by a page administrator). If the page administrator accepts the request for approval 140, the content manager 150 creates a promotional content item 145 that describes the web page 125 and sends the content item 145 to the content delivery module 160 for delivery to users of the online system 100.

The content delivery module 160 selects one or more content items for communication to a client device to be presented to a user. Content items eligible for presentation to the user are retrieved from the content store 340 or from another source by the content delivery module 160, which selects one or more of the content items for presentation to the user. A content item eligible for presentation to the user is a content item associated with at least a threshold number of targeting criteria satisfied by characteristics of the user or is a content item that is not associated with targeting criteria. Example targeting criteria include, whether the content item describes a user of the online system 100 that is connected to the user, whether the user previously accessed information describing an entity represented in the online system 100 that is described in the content item, whether the user interacted with another content item that is related to the current content item, and the like. One example of a content item is a newsfeed story that can include different fields or sets of information, such as a name of a user's friend or connection who posted the story or an object within the online system 100 with which the friend interacted (e.g., "John Smith invited Bob Roberts to John's 21st Birthday Party" or "John Smith liked Big Coffee website"). The story can include one or more graphics, can include links to content on or off of the online system 100, can include icons or fields with which the user can interact (e.g., a Like button, a Share button, a Comments field, etc.), can include sponsored content or an advertisement, and so forth.

The user score determination module 120 includes various modules used for extracting features and scoring page administrators based on the features. The user score determination module 120 comprises the machine learning model 120, a feature extractor 310, a training data store 320, a training module 330, a feature store 380, and a feature aggregation module 375.

The training data store 320 stores training data comprising various web pages, page administrator profiles, and user interactions associated with page administrators. The training data store 320 also associates input data with an indication of the likelihood of the page administrators accepting a request for approval or rejecting a request for approval. This input data may be provided by experts or it may be based on historical information.

The training module 330 identifies training data from the training data store 320 and uses it to train the machine learning model 120. The machine learning model 120 is configured to score page administrators associated with a web page presented via online system 100 based on their likelihood of approving a request for allowing the online system 100 to send sponsored content describing the web page 125 to users of the online system 100. The training process is further elaborated with respect to FIG. 5.

The machine learning model 120 is trained by the training module 330 to score page administrators based on their likelihoods of accepting requests for approval 140 to present sponsored content to users. The machine learning model 120 uses training data from the training data store 320 that corresponds to the types of features that are extracted from the feature store 380 by the feature extractor 310. These features include: the amount of content created by the page administrator for the web page 125, the type of content created by the page administrator for the web page 125, the activities of the page administrator with respect to the web page 125, interactions of the page administrator with fans of the web page 125 (e.g. via a comments section), the number of fans the web page 125 has, the churn status of the web page 125, the ratings of the web page 125, the account type of the web page 125 on the social networking system 100, the number of connections the page administrator has with other users on the online system 100, the length of time the page administrator has been a member of the online system 100, the amount of messages related to sponsored content that the page administrator has sent via the online system 100, the age of the page administrator and the activity level of the page administrator on the online system 100.

In some embodiments, page administrator scores 135 are determined using the feature aggregation module 375 either without or in conjunction with the machine learning model 120. The feature aggregation module 375 uses a weighted aggregate of features from the feature store 380 to generate a page administrator score 135.

The feature extractor 310 extracts features that are required by the machine learning model 120. The features are extracted from various sources. For example, features may be extracted from one of more of the web page 125, the user profile store 350, the action log 365, and the user interaction manager 110.

The feature store 380 stores the output of the feature extractor 310. These features represent information about how page administrators interact with the online system 100, information describing the profiles of the page administrators, and information describing the web page 125. According to an embodiment which uses the feature aggregation module 375, predetermined weights are associated with the various features based on their expected effects on the likelihoods that the page administrators will accept a request to provide sponsored content for the web page 125 to other users of the online system 100. In this embodiment, the online system 100 determines a page administrator score as a weighed aggregate of features scores representing the various features associated with a page administrator.

According to one embodiment, the feature store 380 stores various features related to the interactions of the page administrators with the online system 100, and their interactions with the web page 125 on the online system 100. According to one embodiment, a feature represents the amount of content created for the web page 125 by a page administrator. For example, a page administrator 103 who creates more content for the web page 125 is associated with a higher page administrator score 135 than a page administrator who creates less page content. A feature represents the type of content created by a page administrator for the web page 125. Types of content a page administrator might add to the web page 125 include images, logos, links, call-to-action buttons, applications, contact information, advertisements, and articles. For example, a page administrator who has modified or updated the web page to add call-to-action buttons and advertisements to the web page 125 in the past may be more involved in promoting the web page 125. Accordingly, the user score determination module 120 identifies the types of content added to the web page by the page administrator and analyzes the type of content, for example, based on the keywords introduced in the web page responsive to the update. The user score determination module 120 determines whether the updates indicate that the page administrator is actively promoting the web page based on a matching of the keywords against keywords predetermined to be associated with an active promotion of the web page. If the user score determination module 120 determines that the page administrator is actively promoting the web page, the user score determination module 120 associates the page administrator with a higher page administrator score 135 than a page administrator who mainly contributes images and articles to the web page 125.

Another feature represents the number of reads and writes performed by a page administrator account on the web page 125. The user score determination module 120 associates a higher number of reads and writes by a page administrator on the web page 125 with a higher page administrator score 135. Accordingly, the user score determination module 120 determines that a page administrator that manages the web page actively is more likely to approve a request for sending content associated with the web page to users.

The feature store stores additional features related to page administrator interactions with the web page 125. A feature represents a measure of a level of activity of the page administrator with respect to the web page 125. For example, the user score determination module 120 associates a page administrator with a high level of activity if the number of times the page administrator accesses the web page 125 is above a threshold value, or if the user interactions of the page administrator indicate a high frequency of participation in projects and activities associated with the web page 125. The user score determination module 120 associates a page administrator with a high level of activity with a higher page administrator score. For example, the user score determination module 120 associates a page administrator who spends many hours a day on the web page with a higher page administrator score 135 than a page administrator who only checks the web page 125 for a few hours every week.

Another feature stored by the feature store 380 represents a measure of the rate at which a page administrator interacts with fans of the web page 125, for example, via messages or comments on the web page 125. The user score determination module 120 associates a page administrator who regularly answers questions posed by fans and other web page 125 visitors in a comments section with a higher page administrator score 135 than a page administrator who posts very few or no comments.

The online system 100 tracks information about the web page 125. The feature extractor 310 extracts features from this data and stores them in the feature store 380. Various features related to the web page 125 that affect a page administrator score 135 are here described. A feature represents the number of fans of a web page 125. The user score determination module 120 associates a low number of fans of a web page with a higher page administrator score since the page administrator of a web page with very few fans is determined to be more likely to accept a request to deliver sponsored content for the web page 125 via the online system, as accepting the request for approval 140 could increase the number of fans by exposing more users to sponsored content related to the web page 125. Thus, according to one embodiment, a page administrator associated with a web page 125 that has very few fans receives a higher page administrator score 135 than a page administrator associated with a web page 125 that has many fans.

According to one embodiment, the user score determination module 120 uses a feature representing the churn status of the web page 125 to determine the page administrator score 135. The churn status indicates a rate at which users of the web page 125 leave the web page in a given time interval. Accordingly, these users are not users of the web page 125 by the end of the time interval. For example, a page administrator may be more likely to accept a request to provide sponsored content about the web page 125 to other users of the online system 100 if the web page 125 has a high churn status, since a high churn rate implies that the users 105 that access the web page 125 change frequently. Accordingly, the page administrator is likely to approve a request to promote the web page via sponsored content delivered by the online system to keep attracting new visitors to the web page 125. The user score determination module 120 associates a higher churn status with a higher score for the associated page administrators.

The user score determination module 120 uses a feature representing ratings of a web page 125 to determine scores of page administrators associated with the web page 125. For example, if the web page 125 has low ratings, a page administrator associated with the web page 125 receives a higher page administrator score 135 because the page administrator is more likely to approve a request to provide sponsored content about the web page 125 to users of the online system 100 in an attempt to boost the ratings. The user score determination module 120 uses a feature representing a change in ratings of a web page 125 indicative of falling ratings to determine scores of page administrators associated with the web page 125. Accordingly, the user score determination module 120 associates a page administrator associated with a web page with falling ratings with a higher page administrator score.

Additional features related to the web page 125 stored in the feature store 380 comprise an account type and a call-to-action type of the web page 125 on the online system 100. According to one embodiment, the web page 125 is hosted on the online system 100. The online system 100 stores different account types associated with various web pages 125 and features of the web pages corresponding to the account types, for example, types of HTML tags or keywords found in the web page. The user score determination module 120 determines the account type of a web page based on a comparison of features of the web page with stored features of web pages corresponding to different account types. The user score determination module 120 uses the account type of a web page in determination of page administrator score for the web page. These account types can affect the page administrator scores 135 of page administrators associated with the web page 125. For example, account types associated with causes and charity organizations are associated with a higher page administrator score 135 for the page administrators associated with that web page 125 because the nature of those account types is such that they are likely to need to provide sponsored content and information quickly in response to particular issues or campaigns that may be time sensitive.

The call-to-action type of the web page 125 can also affect the scores of the page administrators associated with the web page 125. The feature extractor 310 determines whether a web page has a call-to-action type by analyzing the content of the web page, for example, by determining whether the web page has a form requesting users to register, and based on the type of key words used on the web page. In an embodiment, the feature extractor 310, analyzes sentences on the web page to determine whether the sentences include keywords indicative of a call to action, for example, "please". In one embodiment, the user score determination module 120 associates a page administrator of a web page 125 determined to have a "sign up" call-to-action type on the online system 100 with a higher page administrator score 135 than a page administrator of a web page 125 with a "play game" call-to-action type because the former is associated with a web page 125 that is actively trying to recruit new members whereas the latter is only entertaining visitors. The feature extractor 310 determines that a web page has a "sign up" call-to-action type if the web page HTML indicates that the web page includes a form for registration as well as keywords indicative of a request for users to register, for example, "register" or "registration". The feature extractor 310 stores a list of keywords that are typically found in a particular call-to-action type. The feature extractor 310 determines that a web page has a "play game" call-to-action type if the web page HTML indicates that the web page includes an embedded script or a link to a game or if the web page includes keywords indicative of a request for users to play a game, for example, "play now". In one embodiment, a call-to-action type associated with a web page is indicated in a call-to-action type field stored with other metadata related to the web page in the content store 340. The feature extractor 310 determines a call-to-action type of a web page by determining the value stored in the call-to-action type field associated with the web page in the content store 340.

The online system 100 receives and stores information and data about the profile of the page administrator. The feature extractor 310 extracts features from this information and stores the extracted features in the feature store 380. In one embodiment, if the user score determination module 120 determines that a page administrator has a higher number of connections with other users through the online system 100, the user score determination module 120 associates the page administrator with a higher page administrator score 135 than a page administrator with very few social connections because a user with more connections may have more users to reach out to with sponsored content about the web page 125.

In an embodiment, the user score determination module 120 uses demographic attributes of page administrators as features for determining the page administrator score 135, for example, the age of the page administrator, the ethnicity of the page administrator, the languages used by the page administrator, the gender of the page administrator, and so on. The user score determination module 120 determines weights for various features based on historical data describing user interactions of page administrators having different demographic attributes.

For example, the user score determination module 120 uses the age of a page administrator as a feature for determining the user score for the page administrator. The user score determination module 120 determines based on historical data that page administrators within a first age range have statistically higher likelihoods of promoting sponsored content for the web pages 125 with which they are associated compared to users of a second age range. Accordingly, the user score determination module 120 associates a page administrator aged within the first age range with a higher page administrator score 135 compared to a page administrator in the second age range.

Similarly, the user score determination module 120 uses the length of time that a page administrator has been a member of the online system 100 as a feature for determining the page administrator score 135. According to one embodiment, the user score determination module 120 associates a first page administrator who has been a member of the online system 100 for a longer amount of time with a higher page administrator score 135 than a second page administrator who is a newer member of the online system 100 because the first page administrator has more experience with the online system 100.

The feature store 380 also stores features describing the activities of a page administrator on the online system 100. According to an embodiment, the user score determination module 120 uses the activity level of the page administrator on the online system 100 as a feature for determining a page administrator score 135. For example, the user score determination module 120 associates a page administrator who is more active on the online system 100 with a higher page administrator score 135 than a page administrator who is less active because increased activity indicates a better knowledge of the online system 100 and a higher likelihood that the page administrator may want to be involved in providing sponsored content for the web page 125.

According to one embodiment, the user score determination module 120 uses content and quantity of messages sent and received by the page administrator via a messaging service provided by the online system 100 as a feature for determining the page administrator score. For example, the user score determination module 120 associates a page administrator with a higher page administrator score 135 if the page administrator has sent or received many messages about the website 125 or about sponsored content related to the website 125.

Overall Process

Figure 4:
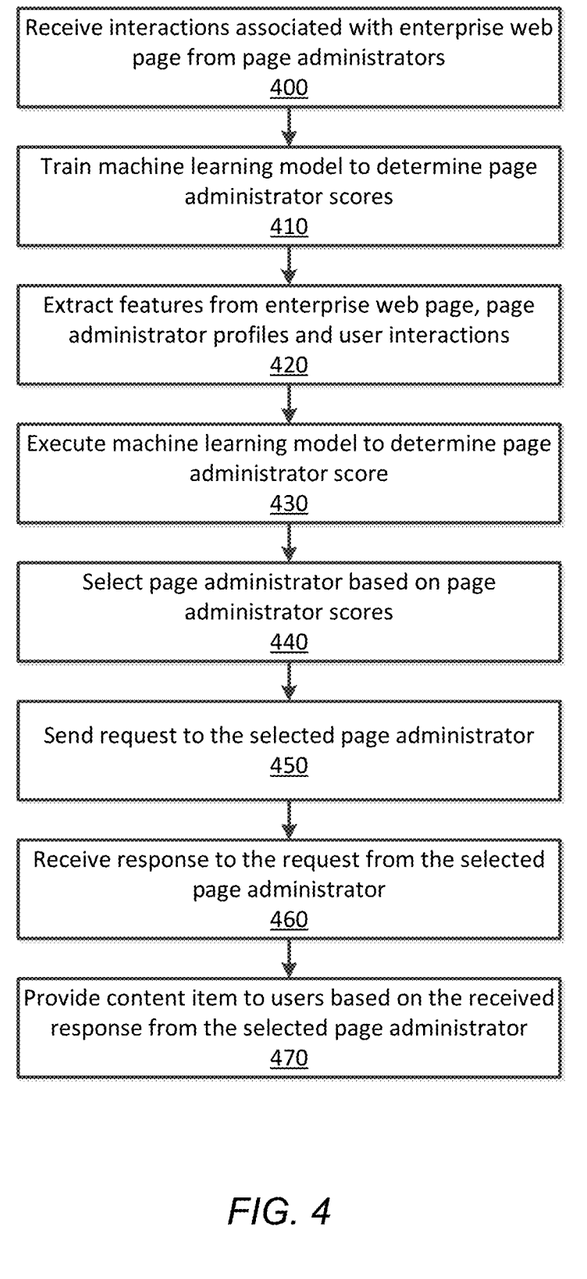
FIG. 4 is a flowchart illustrating the process of selecting page administrators of a web page for sending them requests associated with sponsored content describing the web page, according to an embodiment.

FIG. 4 is a flowchart illustrating the process of selecting page administrators of a web page for sending them requests associated with sponsored content describing the web page, according to an embodiment. The process shown in FIG. 4 selects page administrators who are most likely to accept requests to deliver sponsored content to other members of the online system 100 and provides the page administrators with the requests. The steps illustrated in FIG. 4 may be executed in an order different from that indicated in FIG. 4. Furthermore, the steps may be executed by modules different from the modules indicated herein.

The online system 100 receives 400 interactions associated with the enterprise web page 125 from page administrators. The online system 100 also receives and stores information about the page administrator profiles 115 and the web page 125. A page administrator is associated with a page administrator account. The online system 100 may send a request to the page administrator by sending the request to the page administrator account. User interactions with the online system 100 performed by the page administrator are stored in association with the page administrator account.

The online system 100 trains 410 the machine learning model 120 to determine page administrator scores 135. The machine learning model 120 is trained using training data that is labeled or otherwise annotated before the training process, according to one embodiment. The training data comprises data related to the likelihoods that page administrators will accept requests to provide content about their web pages to other users, and may be based on sample user profiles, known real user profiles, sample web pages, known web pages, and user interaction histories. According to one embodiment, features from the labeled training sets, which are stored in the training data store 320, are extracted by the feature extractor module 310 and used to train the machine learning model 120.

The online system 100 extracts 420 features from the enterprise web page 125, page administrator profiles 115, and page administrator interactions. The feature extractor 310 is used to extract specific features, according to one embodiment. These features may include: the amount of content created by the page administrator for the web page 125, the type of content created by the page administrator for the web page 125, the activities of the page administrator with respect to the web page 125, any interactions the page administrator has with fans of the web page 125 (e.g. via a comments section), the number of fans of the web page 125, the churn status of the web page 125, the ratings of the web page 125, the account type of the web page 125 on the online system 100, the number of connections the page administrator has with other users on the online system 100, the length of time the page administrator has been a member of the online system 100, the amount of messages related to sponsored content that the page administrator has sent via the online system 100, the age of the page administrator, and the activity level of the page administrator on the online system 100.

The online system 100 executes 430 the machine learning model 120 to determine the page administrator scores 135. The machine learning model 120, which was trained using sample data and features, uses the features extracted from the page administrator interactions 110, the web page 125, and the page administrator profile information 130 to determine page administrator scores 135.

The online system 100 selects 440 a page administrator based on page administrator scores 135. In some embodiments, it is also possible that multiple page administrators are selected 440 or no page administrators are selected. According to one embodiment, the selected page administrators are those users who were assigned the highest page administrator scores 135 by the machine learning model 120.

The online system 100 sends 450 requests to the selected page administrator. A page administrator who has been selected based on the page administrator scores 135 is sent a request to allow the online system 100 to provide sponsored content about the web page 125 to other users of the online system 100. The requests may take various forms, including, but not limited to, virtual coupons, upsell, ego services, and mobile promote buttons.

The online system 100 receives 460 a response to the request from the selected page administrator. The response indicates whether the online system 100 may provide sponsored content about the web page 125 to users of the online system 100.

The online system 100 provides 470 a content item to users of the online system 100 based on the received response from the selected page administrator.

Generating and Using a Page Administrator Scoring Model

Figure 5:
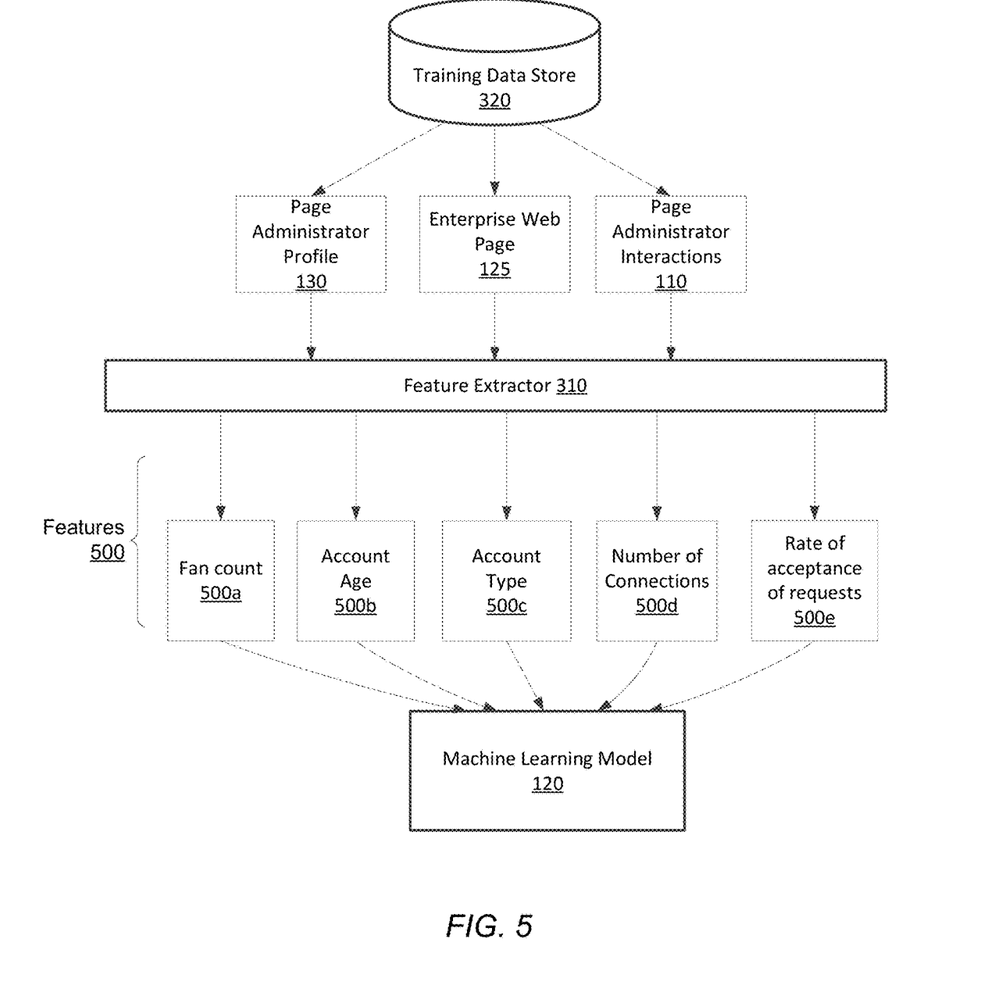
FIG. 5 shows a data flow diagram illustrating training of a machine learning model for scoring page administrators, according to one embodiment.

FIG. 5 shows a data flow diagram illustrating training of a machine learning model for scoring page administrators, according to one embodiment. The machine learning model is trained to score page administrators using data stored in the training data store 320. The information used for training the model 120 comprises the page administrator profile information 130, the web page 125, and the information about user interactions 110 with the online system 100. The information in the training data store 320 comprises data that has been specially chosen, or previously labeled such that it can inform the model.

A feature extractor 310 extracts relevant features 500 from training data that is similar to the page administrator profile data 130, the web page data 125, and the user interaction data 110. For example, the feature extractor 310 might extract information about the fan count 500a, the account age 500b, the account type 500c associated with the enterprise web page 125, the number of connections of the page administrator 500d, and the rate of acceptance of requests 500e of the page administrator. A more detailed, but non-limiting description of the features 500 can be found in the description of FIG. 3.

The extracted features 500 are provided to the machine learning model 120 in order to train it. The model 120 uses the features 500 to determine how to classify or score newly introduced page administrators based on their attributes and other information describing the page administrators.

Figure 6:
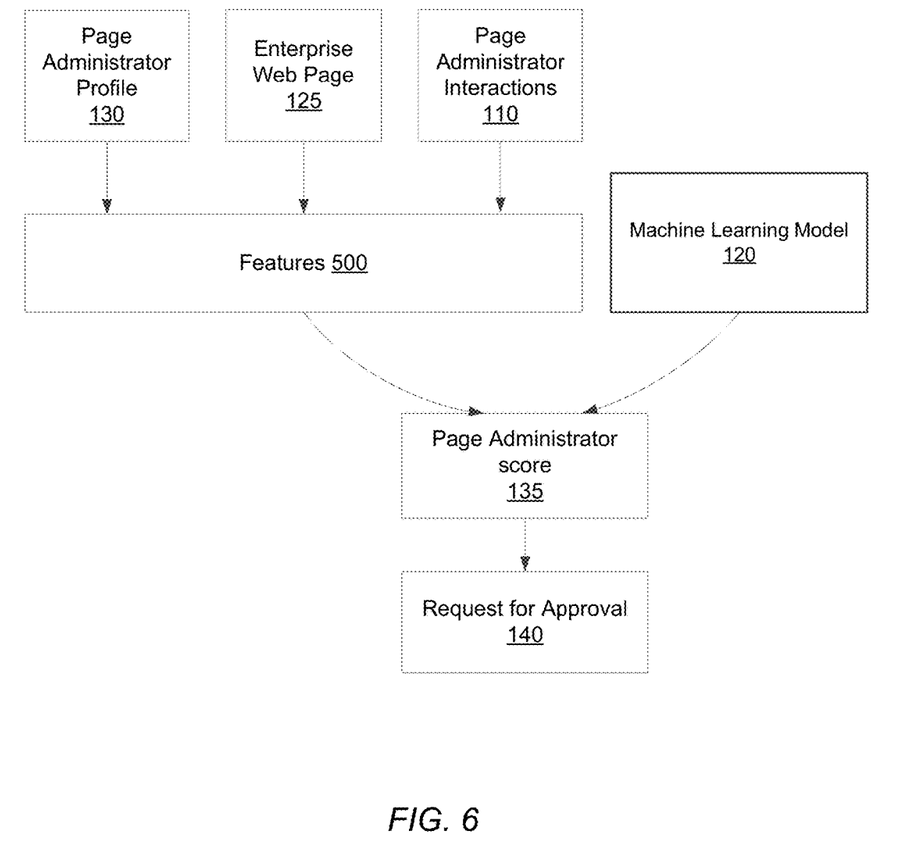
FIG. 6 shows a data flow diagram illustrating scoring of page administrators based on a machine learning model, according to one embodiment.

FIG. 6 shows a data flow diagram illustrating scoring of page administrators based on a machine learning model, according to one embodiment. FIG. 6 demonstrates one way in which the machine learning model 120 may be used to generate page administrator scores 135 and requests for approval of content 140.

The page administrator profile 130, the enterprise web page 125, and the page administrator interactions 110 are used to determine or extrapolate a set of relevant features 500, according to one embodiment. The machine learning model 120 has been trained using similar feature sets. The model 120 is applied to the features 500 with respect to data relating to a page administrator and the web page 125 with which the page administrator is associated. A page administrator score 135 based on the features 500 is determined by the machine learning model 120, according to some embodiments. In some cases, this process is repeated for each page administrator who is associated with the web page 125, until all page administrators have been assigned a page administrator score 135.

Responsive to the page administrator score 135 being significantly high, the page administrator who received the score 135 is sent a request for approval 140 which asks the page administrator for permission as to whether the online system 100 may display sponsored content about the web page 125 to other users of the system 100.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   storing, by an online system, a web page associated with a plurality of page administrator accounts, each page administrator account associated with a page administrator authorized to maintain the web page;
   for each of the plurality of page administrator accounts:
   extracting a feature vector describing the page administrator account, the feature vector comprising one or more features based on user interactions of a page administrator corresponding to the page administrator account, the user interactions with the online system;
   providing the feature vector as input to a machine learning model configured to generate a score indicative of a likelihood of the page administrator being interested in promoting the web page by sending a page promotion content item about the web page to a plurality of users of the online system;
   generating a score for the page administrator account based on the machine learning model;
   selecting a page administrator account from the plurality of page administrator accounts responsive to the generated scores of the plurality of page administrator accounts indicating that the selected page administrator account is more likely to promote the web page than the remaining page administrator accounts;
   generating a content item for a page promotion content item for promoting the web page via the online system, wherein the generated content item comprises a widget placed on a user interface presented to the selected page administrator, the widget configured to allow the selected page administrator to accept a request;
   sending the generated content item to the selected page administrator on the online system; and
   responsive to the selected page administrator account requesting to promote the page via the online system, providing a requested page promotion content item to users of the online system.

2. The method of claim 1, further comprising:
   training the machine learning model using past user interactions of page administrators, the past user interactions with the online system.

3. The method of claim 1, wherein the generated content item comprises a message presented to the selected page administrator via a newsfeed.

4. The method of claim 1, wherein the feature vector includes a feature representing a rate at which the page administrator sends messages via the online system.

5. The method of claim 1, wherein the feature vector includes a feature representing a number of reads and writes made by the page administrator to the web page.

6. The method of claim 1, wherein the feature vector includes a feature representing an account type of the web page.

7. The method of claim 1, wherein the feature vector includes a feature representing a call-to-action type of the web page.

8. The method of claim 1, wherein the feature vector includes a feature representing an activity level of the page administrator on the online system.

9. The method of claim 1, wherein the feature vector includes a feature representing a number of connections of the page administrator in the online system.

10. A method comprising:
    storing, by an online system, a web page associated with a plurality of page administrator accounts, each page administrator account associated with a page administrator authorized to maintain the web page;
    for each of the plurality of page administrator accounts:

extracting features describing the page administrator, the features comprising one or more features based on user interactions of a page administrator corresponding to the page administrator account, the user interactions with the online system;

associating each extracted feature with a feature score value;

generating a user score for each page administrator account based on a weighted aggregate of the feature scores, the user score indicative of a likelihood of the page administrator associated with the page administrator account being interested in promoting the web page by sending a page promotion content item about the web page to a plurality of users on the online system;

selecting a page administrator account from the plurality of page administrator accounts responsive to the generated scores of the plurality of page administrator accounts indicating that the selected page administrator account is more likely to promote the web page than the remaining page administrator accounts;

generating a content item for a page promotion content item for promoting the web page, wherein the generated content item comprises a widget placed on a user interface presented to the selected page administrator, the widget configured to allow the selected page administrator to accept the request;

sending the generated content item to the selected page administrator; and responsive to the selected page administrator account requesting to promote the page via the online system, providing a requested page promotion content item to users of the online system.

11. The method of claim 10, wherein the features comprise a feature representing the activity level of the page administrator on the online system, wherein a higher activity level of the page administrator on the online system is associated with a higher feature score value.

12. The method of claim 10, wherein the features comprise a feature representing a number of connections of the page administrator in the online system, wherein a higher number of connections of the page administrator is associated with a higher feature score value.

13. The method of claim 10, wherein the features comprise a feature representing an account type of the web page, such that account types associated with time sensitive offers or events are associated with a higher feature score value.

14. The method of claim 10, wherein the features comprise a feature representing a call-to-action type of the web page, wherein call-to-action types associated with time sensitive offers or events are associated with a higher feature score value.

15. The method of claim 10, wherein the features comprise a feature representing the number of fans of the web page, such that a lower number of web page fans is associated with a lower feature score.

16. The method of claim 10, wherein the features comprise a feature representing a churn status of the web page, wherein a higher amount of churn status for the web page is associated with a higher feature score.

17. The method of claim 10, wherein the features comprise a feature representing the amount of content the page administrator creates for the web page, wherein an increased amount of content creation is associated with a higher feature score.

18. A non-transitory computer readable storage medium storing instructions for:

storing, by an online system, a web page associated with a plurality of page administrator accounts, each page administrator account associated with a page administrator authorized to maintain the web page;

for each of the plurality of page administrator accounts:
extracting features describing the page administrator account, the features comprising one or more features based on user interactions of a page administrator corresponding to the page administrator account, the user interactions with the online system;

associating each extracted feature with a feature score value;

generating a user score for each page administrator account based on a weighted aggregate of the feature scores, the user score indicative of a likelihood of the page administrator associated with the page administrator account being interested in promoting the web page by sending a page promotion content item about the web page to a plurality of users on the online system;

selecting a page administrator account from the plurality of page administrator accounts responsive to the generated scores of the plurality of page administrator accounts indicating that the selected page administrator account is more likely to promote the web page than the remaining page administrator accounts;

generating a content item for a page promotion content item for promoting the web page, wherein the generated content item comprises a widget placed on a user interface presented to the selected page administrator, the widget configured to allow the selected page administrator to accept the request;

sending the generated content item to the selected page administrator; and responsive to the selected page administrator account requesting to promote the page via the online system, providing a requested page promotion content item to users of the online system.

* * * * *

UNITED STATES PATENT AND TRADEMARK OFFICE
CERTIFICATE OF CORRECTION

PATENT NO. : 10,296,548 B2  
APPLICATION NO. : 15/365743  
DATED : May 21, 2019  
INVENTOR(S) : Hannah Marie Hemmaplardh, Jinyi Yao and Ahmed Magdy Hamed Mohamed

Page 1 of 1

It is certified that error appears in the above-identified patent and that said Letters Patent is hereby corrected as shown below:

In the Claims

Column 19, Claim 10, Line 14, In Claim 10, delete "on" and insert --of-- therefor
Column 19, Claim 10, Line 27, In Claim 10, delete "the" and insert --a-- therefor
Column 19, Claim 11, Line 35 (First Occurrence), In Claim 11, delete "the" and insert --an-- therefor
Column 19, Claim 15, Line 54 (First Occurrence), In Claim 15, delete "the" and insert --a-- therefor
Column 20, Claim 17, Line 8 (First Occurrence), In Claim 17, delete "the" and insert --an-- therefor
Column 20, Claim 18, Line 33, In Claim 17, delete "on" and insert --of-- therefor
Column 20, Claim 18, Line 46, In Claim 18, delete "the" and insert --a-- therefor Signed and Sealed this  
Twenty-second Day of October, 2019

Andrei Iancu  
*Director of the United States Patent and Trademark Office*